US012736922B2

(12) United States Patent
DePaul

(10) Patent No.: US 12,736,922 B2
(45) Date of Patent: Sep. 15, 2026

(54) WEARABLE WAKE UP ALARM SYSTEM

(71) Applicant: Chancellor I. DePaul, Encinitas, CA (US)

(72) Inventor: Chancellor I. DePaul, Encinitas, CA (US)

( * ) Notice: Subject to any disclaimer, the term of this patent is extended or adjusted under 35 U.S.C. 154(b) by 285 days.

(21) Appl. No.: 18/201,691

(22) Filed: May 24, 2023

(65) Prior Publication Data

US 2023/0384739 A1 Nov. 30, 2023

Related U.S. Application Data

(60) Provisional application No. 63/345,352, filed on May 24, 2022.

(51) Int. Cl.
*G04G 15/00* (2006.01)

(52) U.S. Cl.
CPC .................................. *G04G 15/006* (2013.01)

(58) Field of Classification Search
CPC .... G04G 15/00; G04G 15/006; G04G 13/026; G04G 13/023; H05K 5/00
See application file for complete search history.

(56) References Cited

U.S. PATENT DOCUMENTS 3,577,876 A * 5/1971 Spadini ................ G04G 13/021 368/291
3,760,583 A * 9/1973 Tsuruishi ............... G04C 21/34 968/970
5,442,600 A * 8/1995 Kutosky ................. G04F 1/005 368/263
5,966,346 A * 10/1999 Arai ........................ G04B 23/10 368/266
6,014,347 A * 1/2000 Mignot .............. G04B 37/0075 368/255
10,474,111 B2 * 11/2019 Larkin ................. G04G 13/025
2003/0117272 A1 * 6/2003 Fegley ..................... G08B 1/08 340/407.1
2007/0183269 A1 * 8/2007 Baba .................... G04G 13/026 368/110
2009/0147628 A1 * 6/2009 Oh ....................... G04G 13/026 368/73
2009/0231964 A1 * 9/2009 Kraft .................... G04G 13/026 368/250
2011/0230790 A1 * 9/2011 Kozlov ................ G04G 13/026 600/595
2016/0269841 A1 * 9/2016 Shinde ................. H04R 1/1041
2017/0357217 A1 * 12/2017 Raymann ............ G06F 3/04847
2021/0318660 A1 * 10/2021 Hattori ................. G04G 13/021
2023/0085095 A1 * 3/2023 Soji ...................... G04G 21/025 600/27

* cited by examiner

*Primary Examiner* — Sean Kayes
(74) *Attorney, Agent, or Firm* — Donn K. Harms

(57) ABSTRACT

An electronic, silent alarm is provided which includes a body worn alarm apparatus having one or more buzzers for communicating vibration and sound to the skin of a user at a mounting position on the body. The system, employing software operating to the tasks, will determine an awakening time, and for two time periods prior to that awakening time, impart vibrations to gently wake the user. At the determined awakening time, the system operates to communicate the strongest vibrations to the user. The user is, thus, gently awakened over three time periods to eliminate the conventional loud awakening of conventional alarms.

20 Claims, 4 Drawing Sheets

WEARABLE WAKE UP ALARM SYSTEM

This application claims priority to U.S. Provisional Patent Application Ser. No. 63/345,352 filed on May 24, 2022, which is incorporated herein in its entirety by this reference thereto.

BACKGROUND OF THE INVENTION

1. Field of the Invention

The invention herein disclosed relates generally to the field of alarm clocks. More particularly, it relates to a wearable alarm device and system configured to wake a user in a progressive manner.

2. Prior Art

Alarm clocks are employed throughout the world to wake users at a predesignated time of the day. Conventionally, alarm clocks may be dedicated to time keeping and alarming or, more modernly, they may be an application on a smart phone, computer, or tablet or the like. Such devices operate to wake up the user. This waking is accomplished in a majority of such devices by having the device emit a loud, often robotic, noise. The emitted sound, generally, awakens the sleeping user.

While such an alarm system works well for the user in need of awakening, other occupants, such as with couples or roommates, may inevitably have different daily schedules which require awakening at different times than the alarm. When a loud alarm is emitted by the clock or computing device to wake up the user at an intended time, it may often awaken others who do not have to wake up at the same time. Such unintended awakening from the alarm of another person can lead to conflict between the parties.

An additional issue with conventional alarms is the loud emitted alarm itself. A number of health studies regarding the awakening from sleep indicate that a person awakening suddenly to a loud alarm can suffer a rise in blood pressure and an elevated heart rate due to a spike in adrenaline released in such an awakening. This panic, during awakening from a sound sleep, can later cause the user avoidable grogginess, stress, and irritability.

With respect to the above, before explaining at least one preferred embodiment of the alarm system herein for a substantially silent awakening of users, in a sequentially increasing alarm, it is to be understood that the alarm system herein is not limited in its application to the details of employment and to the arrangement of the components or the steps set forth in the following description or illustrated in the drawings. The various software-enable alarm system and methods and steps of the herein disclosed alarm system invention are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based once reviewed, may readily be utilized as a basis for other non auditory and sequentially increasing alarm systems. It is important, therefore, that the embodiments, objects and claims herein, be regarded as including such equivalent construction and methodology insofar as they do not depart from the spirit and scope of the present invention.

SUMMARY OF THE INVENTION

The disclosed system herein provides for a device and system for an alarm clock which is substantially silent to the hearing of occupants of the room of the user so as to wake the user while not awakening persons proximate to the sleeping user.

In preferred modes of the invention, there is included a wearable, wireless microelectronic substantially silent wake up alarm which is configured to gradually wake a user by way of a series of vibrations which increase over a period of time. In such preferred modes of the invention, the vibration intensity communicated to the person of the user, escalates for the series of vibrations over the period of time. Such intensity can include varying a number of pulses per minute generated by a buzzer component and varying a frequency of the emitted sound or vibrations from the buzzer, as noted below.

In the preferred mode of the alarm device herein, a silent wake up alarm phase or period is provided. In this fashion, in a first time period, a minimum amount of vibrations over the time period are communicated to the user in a lower number of pulses. This first period can also have the system adjust the duration of each pulse and frequency or Hz in the lower number of pulses generated to thereby be sensed minimally by the sensory nerves in the skin of the user. This first period may be from one to five minutes in duration. Because of the minimum amount of sensation communicated to the user and the preferred mode of operation to gradually wake the user, a longer first period is preferred, such as three to five minutes.

After this first time period, the system will elevate the number of pulses over the duration of time and may change the frequency or Hz of each pulse to be more easily sensed by the user. This second time period may be, like the first, from one to five minutes in duration.

Following this second period of alarm, a third time period of alarm will be initiated by the system. This third time period may be from one to five minutes and will provide the maximum number of pulses over this time duration which may also be adjusted in frequency or Hz to maximize sensation.

During each of the three time periods, a movement sensor may be provided upon the user worn device, such as an accelerometer, which will sense awakened movement by the user. While the device and system will function without such a movement sensor, this optional component may be preferred to save battery energy and also aid the sleepy user in shutting the system off.

Should such awakened movement indicate an awakening of the user has occurred, the system may cease initiation of subsequent alarm periods. By awakened movement is meant continuous movements of the device for over thirty seconds which would occur, for example, when the user sits up in bed or stands up or moves the limb or body part on which the device is positioned continuously after one alarm period.

The wearable, wireless microelectronic silent wake up alarm device may be a dedicated device (meaning only one function and easy to use) that is configured to provide a number of substantially silent vibrations to a user over a short period of time, such as, for example, over a one to ten minute awakening time period or phase. The vibrations are communicated to the body of the user, such as on an arm, in a manner where the number thereof, the duration of each thereof and/or the frequency thereof is calculated to gently awaken the user from sleep gradually. This is a preferred manner of awakening the user, because sleep studies have shown such a gradual awakening is the closest manner for a user to awaken that mimics the natural awakening process.

The wearable, wireless microelectronic silent wake up alarm is preferably configured to be worn on the body in a comfortable place. Positioning on the body of the user, for example, may include an elastic or adjustable strap or using a medical grade and re-usable adhesive pad.

The wearable, wireless microelectronic substantially silent wake up alarm is preferably small, such as the size of a wristwatch, and is lightweight. Prior to or after positioning on the body of the user the device is easy to program using a smart phone or other computer application and is preferably configured for an easy positioning and removal. The wearable, wireless microelectronic silent wake up alarm device may include an onboard power supply that is replaceable and does not require a battery charger, or it may be rechargeable.

In addition to the provision of the substantially silent wake up system herein in a lightweight dedicated device, software operating to perform the tasks and steps in the system may be configured for operation in an electric wristwatch or similar device so long as they have the requisite buzzer component which will communicate vibrations to the skin of the user in the three periods or phases, noted herein, to produce a gradual and more natural awakening of the user.

By buzzer, in all modes of the device and system herein, is meant any component which will communicate vibrations to the skin of the user when activated and supplied with an electric current. As used herein, such buzzer components, for example and in no way limiting, may include an electromagnetic buzzer or a piezoelectric buzzer both of which are well known and available, for example, from Siemens APT. Buzzer, as used herein, can also include transducers or small loudspeakers which, when energized with an electric current, will produce a number of vibrations over a duration of time which will contact the skin of the user during activation. Such transducers or small loudspeakers are also well known and, for example, included in most smart phones.

By vibration herein is meant, the vibration generated by any buzzer which communicates that vibration to the skin of the user. Where an electromagnetic buzzer is employed, the vibration of a diaphragm periodically vibrates and sounds under the interaction of a small solenoid coil and a magnet. Where a piezoelectric buzzer is employed and energized with an electric power supply, a multi-resonator oscillates and, conventionally, outputs a vibration through a piezoelectric plate. A transducer, when used, will also output a sound from a moving diaphragm to generate vibration. Such vibration, in electromagnetic buzzers and in piezo buzzers and transducers, for example, may produce a vibration in a wide number of frequency ranges.

Buzzers, adjacent to the skin of the user, can, for example only and in no way limiting, be measured in sound pressure which refers to the local pressure deviation from ambient pressure caused by a sound wave generated by the buzzer. When dealing with buzzers which, as noted, also includes audio transducers, sound pressure level (SPL) is a useful specification. SPL logarithmically expresses a wave's sound pressure relative to a reference value. The threshold value is usually the threshold of human hearing at 1 kHz.

The sound output level of buzzers and transducers can, thus, be measured in decibels. This is the level of sound pressure in front of the buzzer or speaker or transducer at a given input power at a given distance. It specifies how loud the buzzer will be and then generate sound pressure which will contact the skin of the user and how much power is needed to achieve this. For example only, 20-30 dB will have a sound pressure level of a calm room, 40-50 dB will have a sound level and related sound pressure level of a washing machine during operation.

In all modes herein the buzzer employed by the device and system is preferably placed in contact with the skin of the user. In hairless skin, there generally are four principal types of mechanoreceptors, and each is shaped according to its function. The tactile corpuscles (also known as Meissner corpuscles) respond to light touch and adapt rapidly to changes in texture such as vibrations around 50 Hz. The bulbous corpuscles (also known as Ruffini endings) detect tension deep in the skin and fascia. The Merkel nerve endings (also known as Merkel discs) detect sustained pressure. The lamellar corpuscles (also known as Pacinian corpuscles) in the skin and fascia detect rapid vibrations of about 200-300 Hz.

Buzzer vibration or sound intensity, as noted, can be measured in decibels. For example and in no way limiting, a 10 dB intensity would compare to the sound of normal breathing of a human and a 50 dB would correlate to the sound of a refrigerator humming. The conventional alarm clock, which induces a panic awakening, is generally considered to have an 80 dB sound intensity. It should be noted that the decibel scale is logarithmic.

In the system herein, the number of pulses per minute can be varied in a preferred range of between 5-100 pulses per minute. Each of these generated pulses from the buzzer can be varied in output frequency by changing the input current to the buzzer, and currently, a range between 20 Hz to 300 Hz is preferred to best be detected by one or multiple skin receptors.

Thus, in varying the intensity of the alarm communicated to the skin of the user in each of the three levels, one or both of the number of pulses per minute and the frequency or Hz of those pulses can be varied to minimize perception of the user during the initial period and maximize it during the final period.

The device, employing software operating to the task of determining an awakening time, will operate to initiate and wake the user at a selected time and/or a calculated time. The user, using graphic interface on a computer, such as a smart phone or laptop or pad, or in some cases a graphic interface on a display positioned on the worn device herein, may either select a desired wake up time, or may indicate a time duration they wish to sleep, wherein software will calculate the wake up time. Where a remote computing device provides the graphic interface for the software to determine a wake up time, it will be in wireless communication with the body-worn device herein. Such wireless communication may be, for example, infrared or RF communications over bluetooth or WiFi.

In all modes of the device and system herein, a timing device, such as an electronic clock or software driven clock, will operate over the sleep time duration the user is to sleep prior to the awakening time, and upon reaching the awakening time, software, operating to the task of energizing or initiating the alarm, will energize the buzzer to generate a sequentially stronger vibration signal which is communicated to the body of the user. Where the device is worn on the wrist, for example, the skin of the arm will be the recipient of the vibrating signal generated by the buzzer which is defined above. However, as noted, the device may be configured for mounting in other places such as, for example, on the earlobe or on the ankle.

In an optional mode of operation of the system herein, the awakening time can be altered by an input from a designated communication. In this mode, software operating to the task of monitoring communications to the user will listen for an input from a user-designated source. This source may be a baby monitor where the device is placed in communication with that baby monitor by the user. When a threshold volume is reached which indicates the baby is generating sufficient sounds to indicate the infant needs attention, software operating to the task of overriding the determined awakening time will do so and initiate the alarm phases. The silent phase may be circumvented and the system would move to the second phase to more quickly wake the user.

Also, in an optional step of the system, the user may designate certain incoming communications to override the determined awakening time. In this optional step, the user can designate communications from a particular phone number or email which will also circumvent the determined awakening time and immediately start to awaken the user in a similar fashion to that where the baby monitor is being watched for input.

In another optional step of the system, the computing device, running the software operating to calculate and set an awakening time, can be in network communication with a voice actuating device. This can be a microphone on the computer, in wireless communication with the body worn alarm, or, for example, an authorized connection to a system, such as that from Amazon where "Alexa" can be instructed to set an alarm for a wake up time. Where the system computing device is employed, voice to text converting software would determine the awakening time communicated by the user by voice. Where an existing voice command system, such as that from Amazon is employed, such voice to text is already present and the software running on the computing device for the system can be configured for authorized connection and instruction from the existing voice command device.

In another software enabled optional step in the system herein, the user may be presented with a graphic interface wherein they may choose their type of sleeping from a deep sleeper who is hard to wake to a light sleeper who easily awakens. Based on this choice, software operating to the task of changing the number or frequency in Hz of the vibrations communicated for each alarm period will cause the vibrations to be stronger or longer and more numerous for a heavy sleeper and less numerous over the period of time and less strong for light sleepers.

Still further, because buzzers and the like operate to generate waves, the number of vibrations or pulses generated by the buzzer can be set to emulate music. Such buzzers, especially where formed of a loudspeaker, can easily produce the vibrations in different musical notes. In this optional step, the user may be provided with an input screen on the video display on the computing device providin the operational steps to the user-worn device. Once the chosen song or musical arrangement is input by the user, the device, during one or all of the alarm time periods or phases, will cause the buzzer to communicate the pulses in form emulating the chosen music.

In all modes of the system and for all the steps herein noted to operate and provide alarm time periods having sequentially stronger alarms communicated to the skin of the user, software running on a computing device software, running in electronic memory, will operate to perform each step or task or calculation herein. For example, based on the communicated desired waking time or a determined awakening time, or other input parameters, software, operating to the task, will designate or calculate an awakening time and cause the alarm device to implement a sequential waking using sequentially longer time periods of substantially silent alarms.

Optionally, the waking time may also include additional user choices or designations of allowed additional signal inputs resulting in additional or overriding alarms. Such additional allowed signal inputs, for example and in no way limiting, may be an auditory signal from a baby monitor or a communication signal from a computing device initiated by a telephone call or text from a predetermined phone number or party. In this fashion, should the user wish to be awakened, if a volume level from the baby monitor indicates the infant needs care, the awakening time would be immediately actuated.

Alternatively, if the user designates that communication from a specific phone number or communication device is important and that device is activated by a third party, the system can initiate the awakening time and alarms therefor. This, for example, would be valuable to medical professionals or other users who are on call and need to be awakened if they are contacted by their employer, such as a hospital.

To use the silent wake up alarm of the present disclosure, the user may download and install the mobile application on a computing device (such as a smartphone of the user). In some embodiments, the mobile application will provide detailed instructions on how to use the silent wake up alarm.

Subsequent to downloading and installing the application for the system, the user would install the battery into the silent wake up alarm device, and then they will sync the application and computing device, on which it is running, to the electronic components operating the silent wake up alarm. Then, the user would turn on the alarm device using the application and set the awakening time to initiate the program.

In some embodiments, upon powering up the silent wake up alarm device, such will be communicated to the computing device in sync with it. The mobile application running software operating to the task, can then provide graphic interfaces for a step by step instructions on how to set the program wake up cycle, including setting the awakening time, setting the vibration strength or the vibration intensity, and the number and the duration of each vibration over the three time periods for such. By vibration strength or intensity is meant adjusting the current flow to the buzzer or buzzers to increase or decrease the dB of the vibration waves output thereby.

All such vibration waking adjustments can be made individually by the user using displayed graphic interfaces which will adjust the operation of the system accordingly or can be made by providing the user with choices as to their level of sleep, whereby the software operating to the task on the computing device will employ vibration durations and vibration strengths which are pre-calibrated and stored in electronic memory which match the input as to sleep levels by the user.

The step by step instructions may then proceed to guide the user on how to attach the silent wake up alarm to the body using the adhesive strips provided or using a band on the housing to thereby operatively position a contact surface on their body. The user may have several options on where to position the housing of the wearable silent wake up alarm, choosing the area most comfortable for the particular user.

Whether following the step by step instructions or not, after the awakening time information has been entered into the mobile application or determined thereby after input of a desired sleep duration, using a software generated graphic interface or the like, the user would attach the housing of the silent wake up alarm to their body. Thereafter, they will wait or sleep until the determined or designated awakening time arrives for the silent vibration alarm sequences or time periods.

In this calculation, software operating to the task will determine an alarm initiation time at a time before the awakening time. Currently, the favored initiation time is substantially at least ten minutes prior to the desired awakening time. When triggered at that initiation time, the silent wake up alarm will vibrate for substantially three to five minutes in a first phase or duration in accordance with the strength and duration of the vibration programming entered by the user. As noted, the strength and duration may also be calculated by the software operating to that task, based on sleep level input by the user, to silently and slowly awaken the user without bothering other persons proximate to the user.

For the default setting, the silent wake up alarm will again vibrate for a second phase or sequence for a duration of time at substantially five minutes prior to wake up time and again at the actual wake up time. This accomplishes two primary goals of the silent wake up alarm. The first being to wake up the user silently so anyone else in the room sleeping will not be awoken by it. The second being to wake up the user gently through the ten minute (or other user-configured short duration period) wake up cycle, so the user does not wake up all of a sudden, which may have negative consequences, such as causing the user's pulse rate to spike, blood pressure to rise, and/or adrenaline to flow. Any and all of these consequences, among many other physiological reactions to being jolted awake, can cause a series of unhealthy issues, such as irritation, grogginess, inhibited thinking, confusion, etc.

Thus, the silent wake up alarm of the present disclosure eliminates these physiological responses as viable outcomes to the alarm. Furthermore, the silent wake up alarm benefits other people, such as those who are deaf or hard of hearing. The silent wake up alarm provides an effective alarm for anyone in that capacity where typical noise or sound-based alarms do not work.

Although some deaf or hard of hearing users may employ other means of waking by alarm, such mechanisms are undesirable. For instance, many users resort to bed shaking, strobe lights, or other undesirable wake up methods. The vibration system used by the silent wake up alarm provides an easy, affordable and viable option for them.

As to electronic memory or computer readable media for the system herein, any combination of one or more computer-usable or computer-readable media, be it transitory or non-transitory, may be employed for operation of the software and the implementation of the alarm system herein. Such, for example and in no way limiting, can include computer-readable media and may include one or more of a portable computer diskette, a hard disk, a random access memory device, a read-only memory device, an erasable programmable read-only memory (EPROM or Flash memory) device, a portable compact disc read-only memory device, an optical storage device, and other electronic memory magnetic storage devices. Software or computer program code for carrying out the individual and sequential alarm calculation and implementation and operation of the present invention may be written in any combination of one or more programming languages.

The steps or method of operation and/or execution of the various modes and tasks of the silent alarm system herein may be illustrated as blocks or steps in the drawings which may represent one or more sequences in the operation of the steps and assessments in the system herein. These operations or steps can be implemented in computer hardware running software operating to process input data for calculated alarms, to accomplish the task or step, or a combination thereof.

With regard to software operating to any noted system task or to activate or operate one or more steps indicated in the system herein, such represents computer-executable instructions stored upon one or more transitory or non-transitory computer-readable storage media, which, when executed by one or a plurality of processors, which will operate to perform the recited task, assessment, calculation, operation or step.

Computer-executable instructions, herein in general, include routines, programs, algorithms, data structures, and the like which are configured to perform particular functions or to implement particular abstract data types or steps noted.

It should be noted that the sequence in which the steps of the system herein are described or depicted for determining desired alarms and actuating alarms to wake users, are not intended to be construed as a linitiation. It should be understood that any number of the described or designated steps can be combined in any order and/or in parallel to implement the described and depicted assessments and processes. In some modes of the system herein, one or more steps can be rearranged or omitted entirely. Still further, the software-enabled steps in the system herein can be combined in whole or in part with each other or with other steps or methods.

With respect to the above description, before explaining at least one preferred embodiment of the system and method of assessing room airflow characteristics and optimizing such for minimization of the impact of particulate and pathogens, it is to be understood that the invention is not limited in its application to the details of operation nor the arrangement of the components or the steps set forth in the following description or illustrations in the drawings. The various methods of implementation and operation of the system and method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other methods and systems for room airflow assessment and for carrying out the several purposes of the present method. Therefore, that the objects and claims herein should be regarded as including such equivalent construction, steps, and methodology insofar as they do not depart from the spirit and scope of the present invention.

It is an object of this invention to provide a computer-implemented, substantially silent alarm device and system employing software operating to the task of determining and actuating a sequential alarm which sequentially increases in strength to wake users substantially silently.

It is another object of this invention to provide such a silent alarm device and system which will awaken the user and which will not awaken persons proximate to the sleeping user.

It is a further object of this invention to provide such a device and system which is operable in a body-worn component.

These, together with other objects and advantages, which will become subsequently apparent, reside in the details of the construction and operation of the alarm clock system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some but not the only or exclusive examples of embodiments and/or steps of the silent waking alarm system herein. It is intended that the embodiments and figures disclosed herein are to be considered illustrative of preferred modes of the system rather than limiting.

DETAILED DESCRIPTION OF THE PREFERRED EMBODIMENTS OF THE INVENTION

Figure 1:
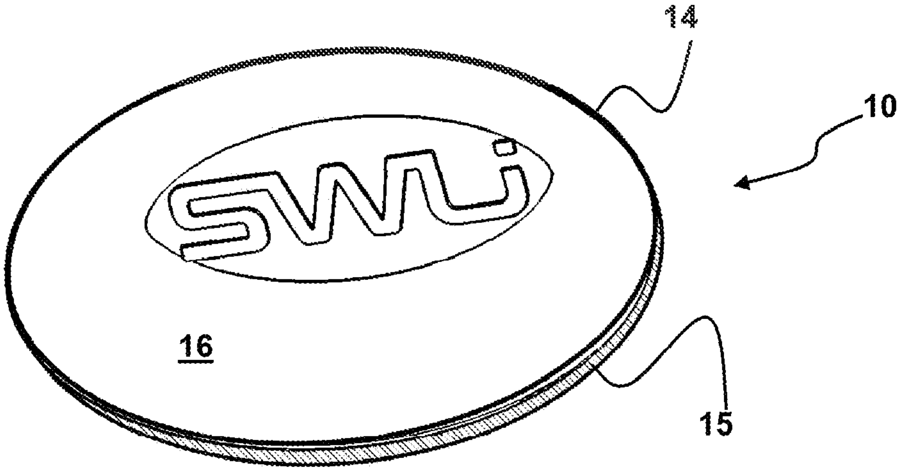
FIG. 1 is a perspective view of the curved oval housing of the device herein in which the electronic components and onboard battery are held.

Referring now to the drawings the electronic silent alarm apparatus herein includes a body worn alarm device 10 and a computing device which is shown in simple format by the depictions of FIGS. 1-6, as noted above. Also included, in all modes of the apparatus, is software operating to the task of performing each step or task in the method of operation of the body worn alarm device 10 which will operate on a computing device 12.

As noted, the electronic silent alarm apparatus herein will, in all modes, include the body worn alarm device 10 in combination with a remote computing device, in the preferred mode, or onboard in a self contained apparatus and will include a video display, one or more processors, and electronic memory storing one or more computer programs which are configured to be executed by the one or more processors to perform the one or more computer programs including instructions for each step in the system of determining and operating silent alarms to wake the user. As such, by electronic silent alarm apparatus herein is meant that the one or more processors and electronic memory may be positioned on a remote computing device, such as a smartphone in a wireless communication with the body worn alarm device 10, or the processors and electronic memory may be located within the housing 14, or electronic processors and electronic memory may be located in both the remote computing device and the housing 14.

Figure 2:
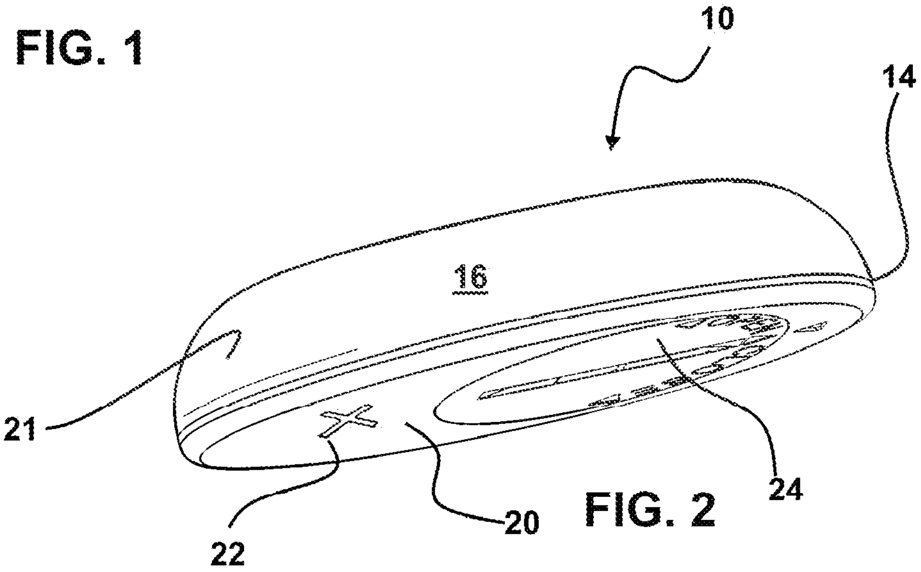
FIG. 2 shows a lower perspective view of the housing of the device showing the contact surface opposite the curved upper surface which is positionable in contact with the skin of the user and also shows a battery insertion opening.
Figure 3:
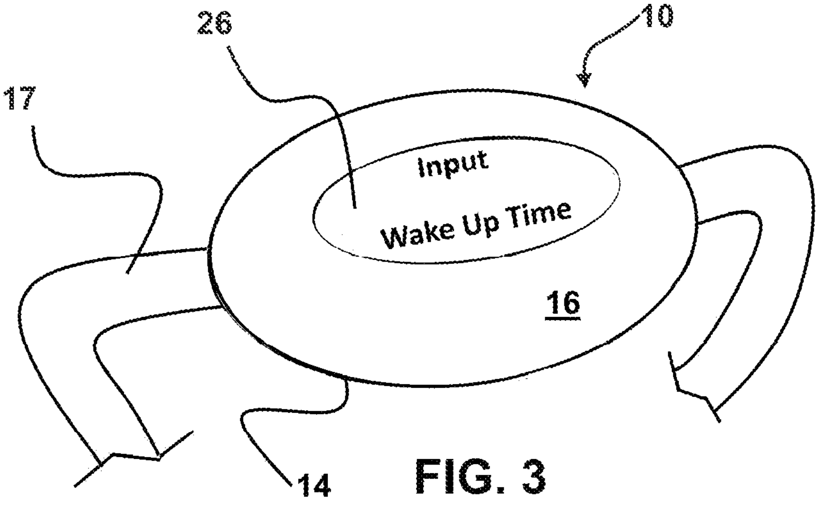
FIG. 3 shows a mode of the device wherein a video display is included in the housing in a position to allow input by the user of an awakening time as well as other optional inputs.

As shown in FIGS. 1-3, the body worn alarm device 10 has a housing 14 which is attachable to the person of the user. This attachment preferably holds the contact surface 20 in contact directly with the skin of the user. Connectors are employable to hold the body worn apparatus or device 10 in this direct contact with the skin. The connector may be an adhesive pad 15 or may be a band 17 or strap which will extend around the user and hold the contact surface 20 of the body worn alarm device 10 in direct contact with the skin of the user in a mounting position such as the wrist.

If the strap 17 is employed, preferably the strap 17 will be elastic and initially smaller than the distance around the mounting position on the body of the user. This will allow the user to form a biased contact of the contact surface 20 against the skin of the user at the mounting point on their body for the body worn apparatus or device 10, thereby insuring a more quiet operation and better communication of the vibrations or pulses to the skin of the user.

The housing 14, as depicted, is of a shape which is particularly preferred in that it has a curved upper surface 16 opposite the contact surface 20 and a has a circular or oval perimeter edge 21 defining a substantially oval shape therearound. This curved housing 14 configuration is particularly preferred as it is less likely to catch on clothing or bedding during use due to the elimination of sharp corners.

In FIG. 2 is depicted the housing 14 from a lower perspective view thereof. The contact surface 20, as noted, is configured for a direct contact against the skin of the user in the mounted position on their body. This direct contact is preferred to maximize transmission of vibrations and sound to the user and to minimize the sound of the buzzer which might emanate to areas surrounding the housing 14 during operation in any of the three alarm phases.

Figure 4:
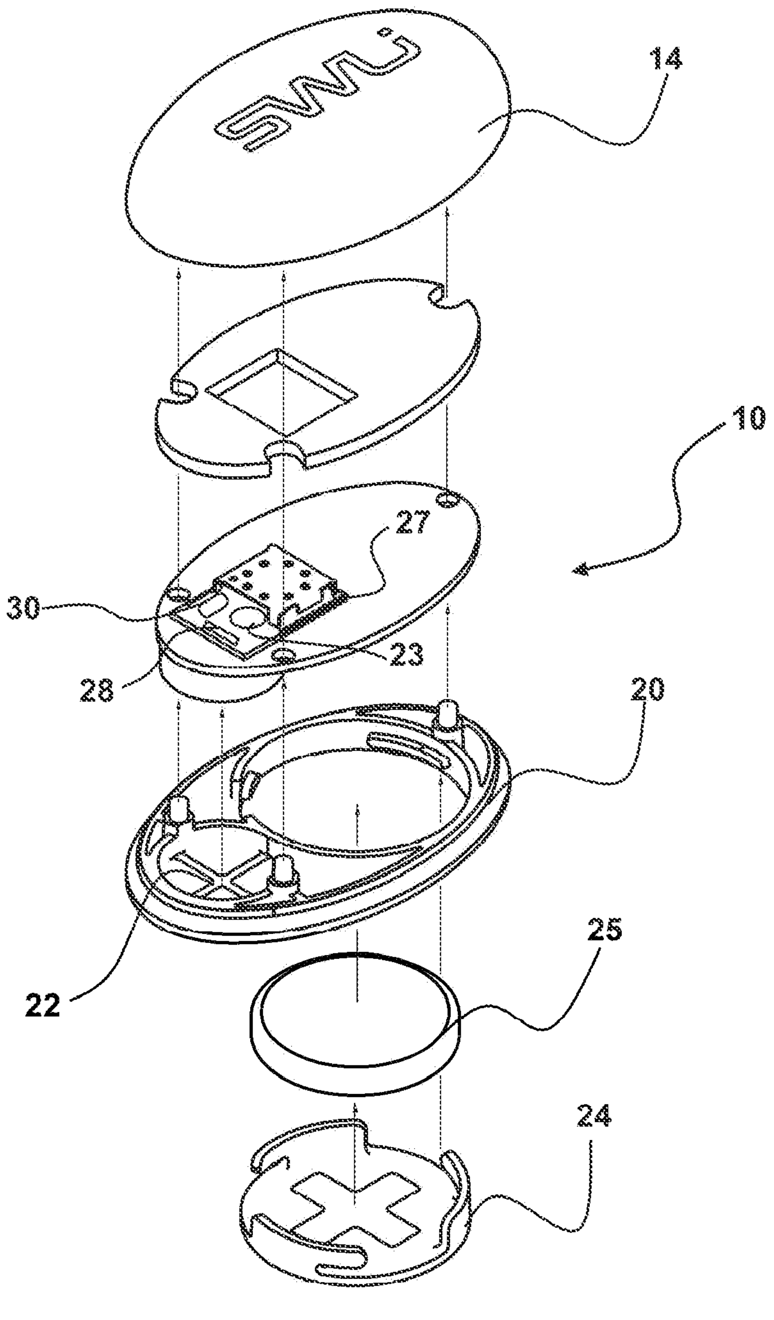
FIG. 4 depicts an exploded view of the device which is configured for contacted engagement with the skin of a user showing the onboard battery and the circuitry which operates the onboard buzzer.

As can be seen, the planar contact surface 20 may have a recess 22 therein for enhanced communication of vibrations from the buzzer 23 (FIG. 4). The recess 22 may also be an opening communicating through the contact surface 20. The recess 22, with the contact surface 20 held in a contact with the skin of the user, will form a substantially sealed cavity which will further help contain the noise from vibrations emanating from the buzzer 23 within the cavity and housing. This helps to prevent sound from emanating to areas surrounding the housing 14 and reduces the chances of a third party hearing it. Also shown is a battery insertion opening cover 24 which is removably engageable to allow for insertion and removal of a battery 25 (FIG. 4) providing electric power to operate the device 10.

In FIG. 3 there can be seen the housing 14 of the device which has the strap 17 engaged thereto which provide a removable biased contact of the contact surface 20 against the skin of the user when the housing 14 is in a mounted position upon the body of the user. Also shown is an optional video display 26 which includes a touch screen whereby the user may input operating parameters such as the awakening time, upon a software generated graphic interface. As noted, to save electric power and for a less complicated operation a remote computing device 12 is preferred which will wirelessly communicate with a transceiver within the housing 14, such as in FIG. 5.

In FIG. 4 is shown an exploded view of the body worn alarm for the electronic silent alarm apparatus herein. As shown, the curved housing 14 engages with the contact surface 20 to hold the battery 25 which powers the electronic circuit board 27 which includes components which operate to energize the buzzer 23 in the three phases of operation. Also shown are the recess 22 which is shown as an opening in this view.

The circuit board 27 includes processors and electronic switching to energize the buzzer 23 for the number of pulses in each of the three phases of operation and for the durations of each according to such determined by software operating to the task noted herein. The onboard battery 25 provides the electric current for the operation of the processors and switches on the circuit board 27 as well as to energize and operate the buzzer 23.

Figure 5:
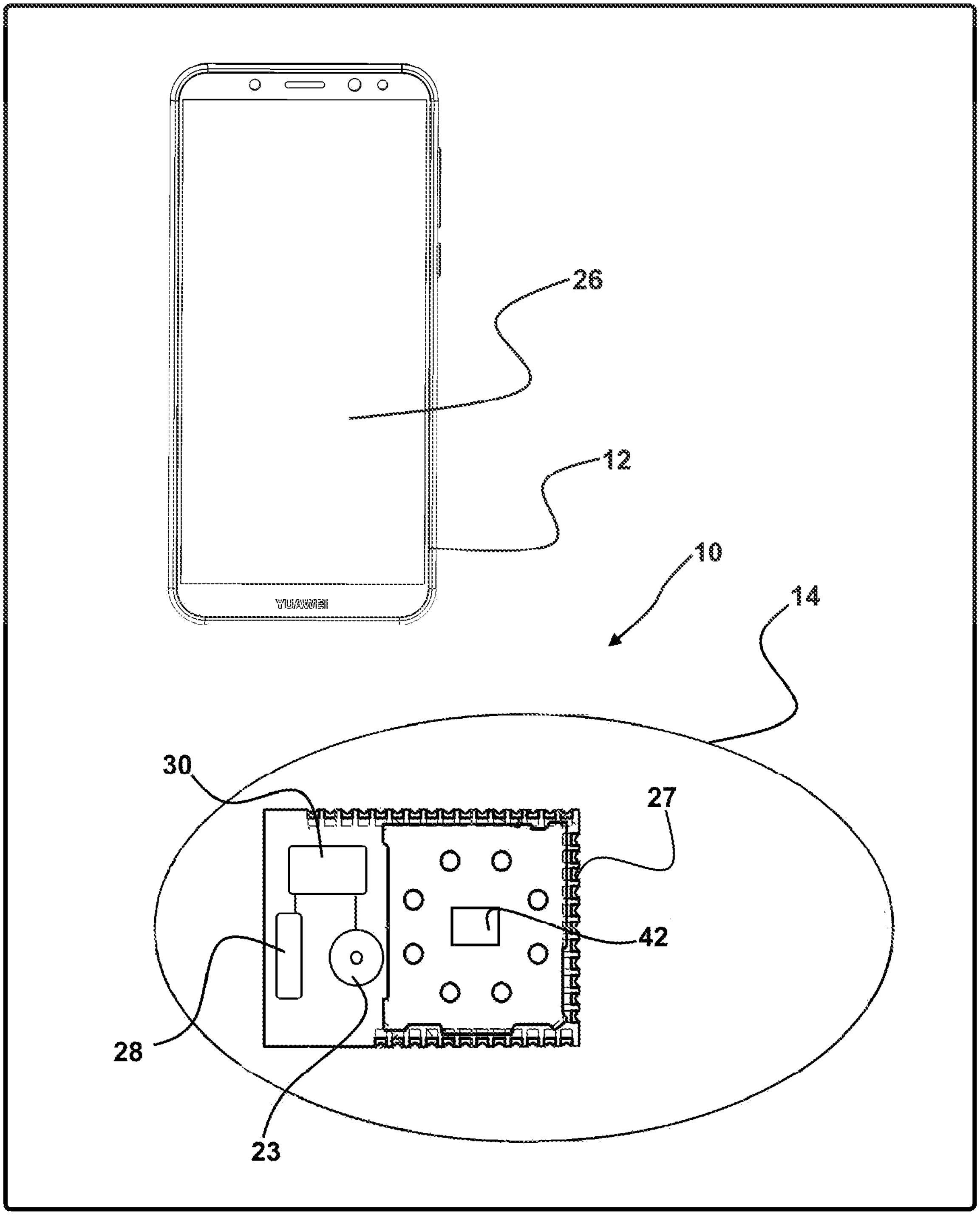
FIG. 5 shows the electronic circuit board of the device which is positioned within the housing and a remote computing device, such as a smartphone or other computer which is in wireless communication with the circuit board components.

Shown in FIG. 5 is the preferred configuration of the electronic silent alarm apparatus herein wherein a remote computing device 12 is in wireless communication with the body worn alarm 10 herein. This is accomplished using the onboard wireless communication transceiver for the computing device 12 over bluetooth or WiFi or similar broadcast communications. A wireless transceiver 28 and processor 30 on the body worn alarm will be paired to that of the computing device 12 in a conventional fashion to allow the requisite communication to operate the buzzer 23 on the body worn alarm 10 for the three phases noted herein.

Figure 6:
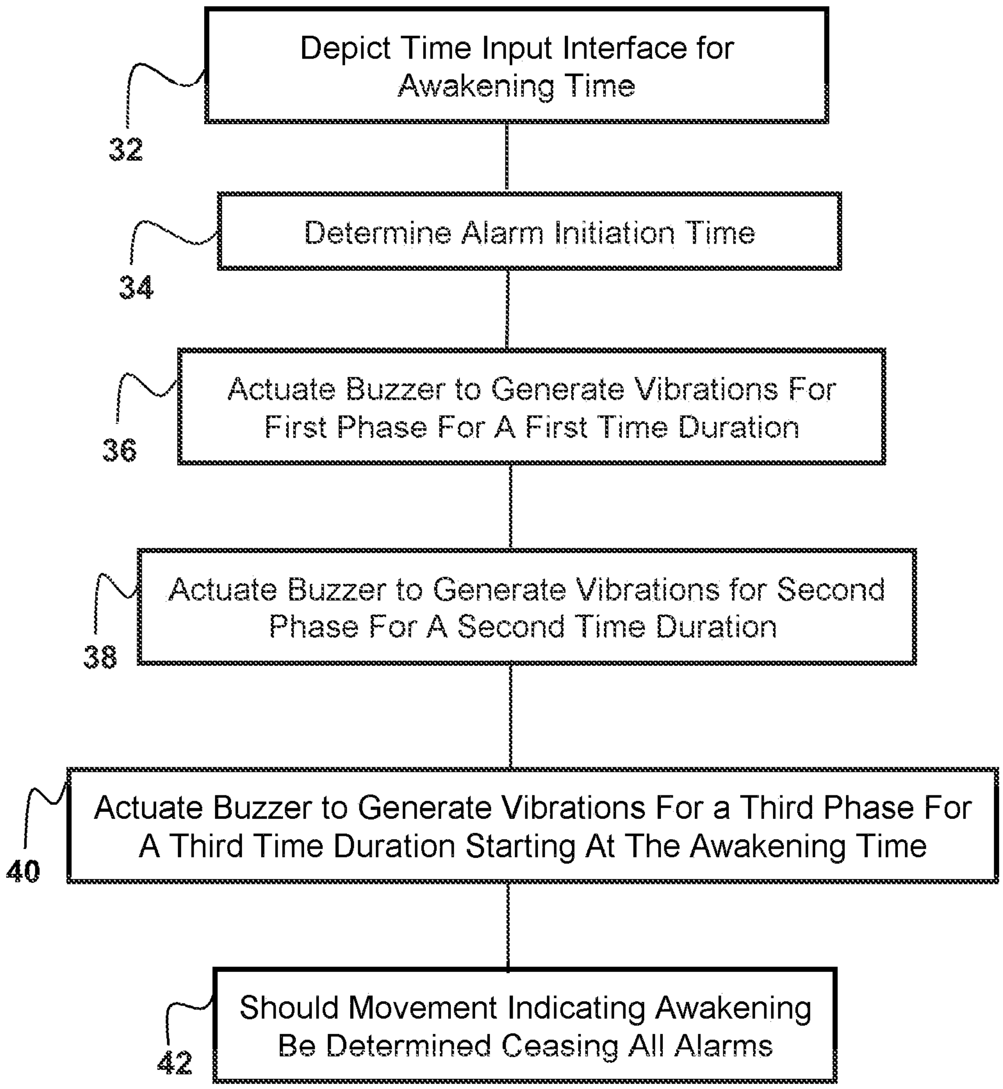
FIG. 6 shows a graphic depiction of steps in operation of the device and system herein.

Shown in FIG. 6 is a simple graphic depiction of steps of the system herein in operation to provide the three phases of operation to awaken the user.

As shown, the system will depict on a video display 26 a time input interface which allows the user to input a preferred awakening time 32.

In accordance to a user input of an awakening time, the system will determine an alarm initiation time 34 which is prior to said awakening time 32.

In accordance with the determined alarm initiation time 34, software running on the system will cause the buzzer to generate a first number of vibrations therefrom in a first phase for a first time duration at the determined alarm initiation time 36.

Next and subsequent to an ending of the first time duration of the first phase, software running on the system will operate to the task of energizing the buzzer to generate a second number of vibrations therefrom for a second phase which has a second time duration, in a time slot between an end of the first phase and the waking time 38.

In a next software enabled step, at the determined waking time, the software will operate to the task of energizing the buzzer to generate a third number of vibrations therefrom for a third phase having a third time duration 40. This third phase will have the most number of pulses for the longest individual durations thereof and may have stronger pulses to insure awakening of the user.

It should be noted that the system employing software operating to the step of ceasing the alarm phases may be included which will operate to de-energize the buzzer if movement indicating the user is awake is sensed. Such may be determined for example by movement of an onboard accelerometer 42 positioned on the body worn alarm 10.

While all of the fundamental characteristics and features of the wearable wake up alarm device and system herein have been shown and described herein, with reference to particular embodiments thereof, a latitude of modification, various changes and substitutions are intended in the foregoing disclosure and it will be apparent that in some instances, some features or steps of the disclosed system may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention herein disclosed.

What is claimed is:

1. An electronic silent alarm apparatus, comprising:

a body worn alarm apparatus having a housing and including one or more buzzers to impart vibration on said housing, and a wireless receiver;

a display;

one or more processors; and electronic memory storing one or more computer programs configured to be executed by the one or more processors, the one or more computer programs including instructions for:

depicting on the display a time input interface that permits receipt of a user input of an awakening time using a touchscreen or voice to text conversion;

in accordance with said received user input of said awakening time determining a first alarm initiation time which is prior to said awakening time;

in accordance with said first alarm initiation time communicating a signal to said one or more buzzers to energize said one or more buzzers to generate a first number of vibrations therefrom in a first phase having a first time duration at said first alarm initiation time;

subsequent to said first time duration of said first phase of vibrations, determining a second alarm initiation time which is prior to said awakening time and after said first initiation time;

in accordance with said second alarm initiation time, communicating a signal to said one or more buzzers to energize said or more buzzers to generate a second number of vibrations therefrom for a second phase having a second time duration, said second phase being in between said first phase and said awakening time;

at said awakening time, energizing said buzzer to generate a third number of vibrations therefrom for a third phase having a third time duration, whereby a user is awakened in a sequence by said first number of vibrations, said second number of vibrations, and said third number of vibrations escalating in intensity through said first phase and said second phase and said third phase.

2. The electronic silent alarm apparatus of claim 1 wherein said display and said one or more processors and said electronic memory are located in a computing device having a wireless transmitter to establish wireless communication with said body worn alarm apparatus.

3. The electronic silent alarm apparatus of claim 2 wherein said time input interface presents a user with an option to input a duration of time for sleeping; and in accordance to a user input of said duration of time for sleeping, said computer program instructions enable said one or more processors to determine said awakening time.

4. The electronic silent alarm apparatus of claim 3 additionally including:

a connector to hold a contact surface of the housing of the body worn alarm apparatus in a direct contact against the skin of the user; whereby said direct contact reduces sound emanating from said one or more buzzers.

5. The electronic silent alarm apparatus of claim 4 additionally including:

a recess forming an opening in said contact surface of a housing of the body worn alarm apparatus.

6. The electronic silent alarm apparatus of claim 4 additionally including:

a movement sensor located within or on said housing; and processor instructions for communicating a signal to one or more said buzzers in accordance with a received signal from said movement sensor to cease energizing said one or more buzzers.

7. The electronic silent alarm apparatus of claim 2 additionally including:

a connector to hold a contact surface of the housing of the body worn alarm apparatus in a direct contact against the skin of the user; whereby said direct contact reduces sound emanating from said one or more buzzers.

8. The electronic silent alarm apparatus of claim 7 additionally including:

a recess forming an opening in said contact surface of a housing of the body worn alarm apparatus.

9. The electronic silent alarm apparatus of claim 3 additionally including:

a movement sensor located within or on said housing; and processor instructions for communicating a signal to one or more said buzzers in accordance with a received signal from said movement sensor to cease energizing said one or more buzzers.

10. The electronic silent alarm apparatus of claim 1 wherein said time input interface presents a user with an option to input a duration of time for sleeping; and in accordance to a user input of said duration of time for sleeping, said computer program instructions enable said one or more processors to determine said awakening time.

11. The electronic silent alarm apparatus of claim 1 additionally including:

a sleeping level input interface presents a user with an option to input a level of sleep of said user;

in accordance to a user input of a level of sleep, said computer program instruction enables said one or more processors to adjust an intensity of waking output and based thereon communicate signals via said wireless receiver to said one or more buzzers to adjust one or both of said first number of vibrations and a duration of each thereof.

12. The electronic silent alarm apparatus of claim 11 additionally including:

in accordance with said user input of a level of sleep, said computer program instruction enables said one or more processors to adjust an intensity of waking output and based thereon communicate signals via said wireless receiver to said one or more buzzers to adjust one or both of:

said second number of vibrations and a duration of each thereof; and said third number of vibrations and a duration of each thereof.

13. The electronic silent alarm apparatus of claim 12 additionally including:

a connector to hold a contact surface of the housing of the body worn alarm apparatus in a direct contact against the skin of the user; whereby said direct contact reduces sound emanating from said one or more buzzers.

14. The electronic silent alarm apparatus of claim 1 additionally including:

a connector to hold a contact surface of the housing of the body worn alarm apparatus in a direct contact against the skin of the user; whereby said direct contact reduces sound emanating from said one or more buzzers.

15. The electronic silent alarm apparatus of claim 14 additionally including:

a recess forming an opening in said contact surface of a housing of the body worn alarm apparatus.

16. The electronic silent alarm apparatus of claim 1 additionally including:

a movement sensor located within or on said housing; and processor instructions for communicating a signal to one or more said buzzers in accordance with a received signal from said movement sensor to cease energizing said one or more buzzers.

17. An electronic silent alarm apparatus, comprising:

a body worn alarm apparatus having a housing and including one or more buzzers to impart vibration on said housing, and a wireless receiver;

a display;

one or more processors; and electronic memory storing one or more computer programs configured to be executed by the one or more processors, the one or more computer programs including instructions for:

depicting on the display a time input interface that permits receipt of a user input of an awakening time using a touchscreen or voice to text conversion;

in accordance with said received user input of said awakening time determining a first alarm initiation time which is prior to said awakening time;

in accordance with said first alarm initiation time communicating a signal to said one or more buzzers to energize said one or more buzzers to generate a first number of vibrations therefrom in a first phase having a first time duration from one to five minutes at said first alarm initiation time;

subsequent to said first time duration of said first phase of vibrations, determining a second alarm initiation time which is prior to said awakening time and after said first initiation time;

in accordance with said second alarm initiation time, communicating a signal to said one or more buzzers to energize said or more buzzers to generate a second number of vibrations therefrom for a second phase having a second time duration of one to five minutes, said second phase being in between said first phase and said awakening time;

at said awakening time, energizing said buzzer to generate a third number of vibrations therefrom for a third phase having a third time duration of one to five minutes, whereby a user is awakened in a sequence by said buzzer operating during said first phase and said second phase and said third phase.

18. The electronic silent alarm apparatus of claim 17 wherein the one or more computer programs including instructions are configured for:

receiving an input from a user-designated source, and energize said one or more buzzers.

19. The electronic silent alarm apparatus of claim 18 wherein the user-designated source includes a baby monitor, a phone number, or email.

20. The electronic silent alarm apparatus of claim 17, wherein said first number of vibrations, said second number of vibrations, and said third number of vibrations escalate in intensity through said first phase and said second phase and said third phase.

* * * * *